US012782863B2

(12) United States Patent
Yamagishi

(10) Patent No.: US 12,782,863 B2
(45) Date of Patent: Nov. 3, 2026

(54) IMAGE FORMING APPARATUS

(71) Applicant: KYOCERA DOCUMENT SOLUTIONS INC., Osaka (JP)

(72) Inventor: Rei Yamagishi, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 19/063,219

(22) Filed: Feb. 25, 2025

(65) Prior Publication Data

US 2025/0278052 A1 Sep. 4, 2025

(30) Foreign Application Priority Data

Feb. 29, 2024 (JP) ................................ 2024-029735

(51) Int. Cl.
*G03G 21/12* (2006.01)
*G03G 15/08* (2006.01)
*G03G 21/10* (2006.01)
*G03G 21/16* (2006.01)

(52) U.S. Cl.
CPC ......... *G03G 21/12* (2013.01); *G03G 15/0875* (2013.01); *G03G 15/0886* (2013.01); *G03G 21/105* (2013.01); *G03G 21/1676* (2013.01); *G03G 2215/068* (2013.01); *G03G 2215/0692* (2013.01); *G03G 2221/163* (2013.01); *G03G 2221/1815* (2013.01)

(58) Field of Classification Search
CPC ...... G03G 21/12; G03G 21/105; G03G 21/10; G03G 21/1821; G03G 15/0886
See application file for complete search history.

(56) References Cited

U.S. PATENT DOCUMENTS

| | | | | |
|---|---|---|---|---|
| 2011/0236055 | A1* | 9/2011 | Mori | G03G 21/105 399/101 |
| 2015/0346640 | A1* | 12/2015 | Takahashi | G03G 21/1828 399/98 |
| 2017/0003627 | A1 | 1/2017 | Inada | |
| 2017/0097587 | A1 | 4/2017 | Inada | |
| 2018/0224794 | A1 | 8/2018 | Kamoshida | |
| 2019/0361383 | A1* | 11/2019 | Sato | G03G 21/12 |

(Continued)

FOREIGN PATENT DOCUMENTS

| | | | |
|---|---|---|---|
| JP | 113015 | A | 1/1999 |
| JP | 201768211 | A | 4/2017 |
| WO | WO2021080637 | A1 | 4/2021 |

OTHER PUBLICATIONS

Search Report issued on Jun. 12, 2025 for EP application No. 25160202.5.

*Primary Examiner* — Jessica L Eley
(74) *Attorney, Agent, or Firm* — Li & Cai Intellectual Property Office

(57) ABSTRACT

An image forming apparatus includes a casing, an image carrier unit, and a waste toner container. The image carrier unit is housed in the casing. The image carrier unit includes an image carrier on which an electrostatic latent image is formed. The waste toner container is housed in the casing. The waste toner container collects waste toner discharged from the image carrier unit. The image carrier unit is insertable or removable from one side in a first direction in the casing. The waste toner container is insertable or removable from another side of the first direction in the casing.

2 Claims, 6 Drawing Sheets

(56) References Cited

U.S. PATENT DOCUMENTS

| | | | | |
|---|---|---|---|---|
| 2020/0301353 | A1* | 9/2020 | Sato | G03G 21/1803 |
| 2021/0232080 | A1* | 7/2021 | Sato | G03G 21/1853 |
| 2023/0266706 | A1* | 8/2023 | Sato | G03G 21/12 399/360 |

* cited by examiner

IMAGE FORMING APPARATUS

CROSS-REFERENCE TO RELATED PATENT APPLICATION

This application claims the benefit of Japanese Priority Patent Application JP 2024-029735 filed Feb. 29, 2024, under 35 U.S.C. 119, the entire contents of which are incorporated herein by reference.

FIELD OF THE DISCLOSURE

The present disclosure relates to an image forming apparatus.

BACKGROUND OF THE DISCLOSURE

Japanese Patent Application Laid-open No. 2017-68211 has disclosed an image forming apparatus. The image forming apparatus according to Japanese Patent Application Laid-open No. 2017-68211 develops electrostatic latent images formed on photosensitive drums serving as image carriers with toner as toner images. The toner images on the photosensitive drums are transferred to a transferring belt. Then, the toner images on the transferring belt are further transferred to a paper sheet. The image forming apparatus according to Japanese Patent Application Laid-open No. 2017-68211 has an opening on its side surface. The opening is used for mounting and removing a toner cartridge. The toner cartridge is arranged in the opening for mounting and removing the toner cartridge. The toner cartridge includes a supply toner storage part and a waste toner collection part. The waste toner collection part collects waste toner discharged from drum units including the image carriers.

SUMMARY OF THE DISCLOSURE

An image forming apparatus according to an aspect of the present disclosure includes a casing, an image carrier unit, and a waste toner container. The image carrier unit is housed in the casing. The image carrier unit includes an image carrier on which an electrostatic latent image is formed. The waste toner container collects waste toner discharged from the image carrier unit. The image carrier unit is insertable or removable from one side in a first direction in the casing. The waste toner container is insertable or removable from another side of the first direction in the casing.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of an image forming apparatus 10 according to the present disclosure will be described with reference to the drawings. Note that in the figures, the same or corresponding portions will be denoted by the same reference signs and the descriptions will not be repeated.

Figure 1:
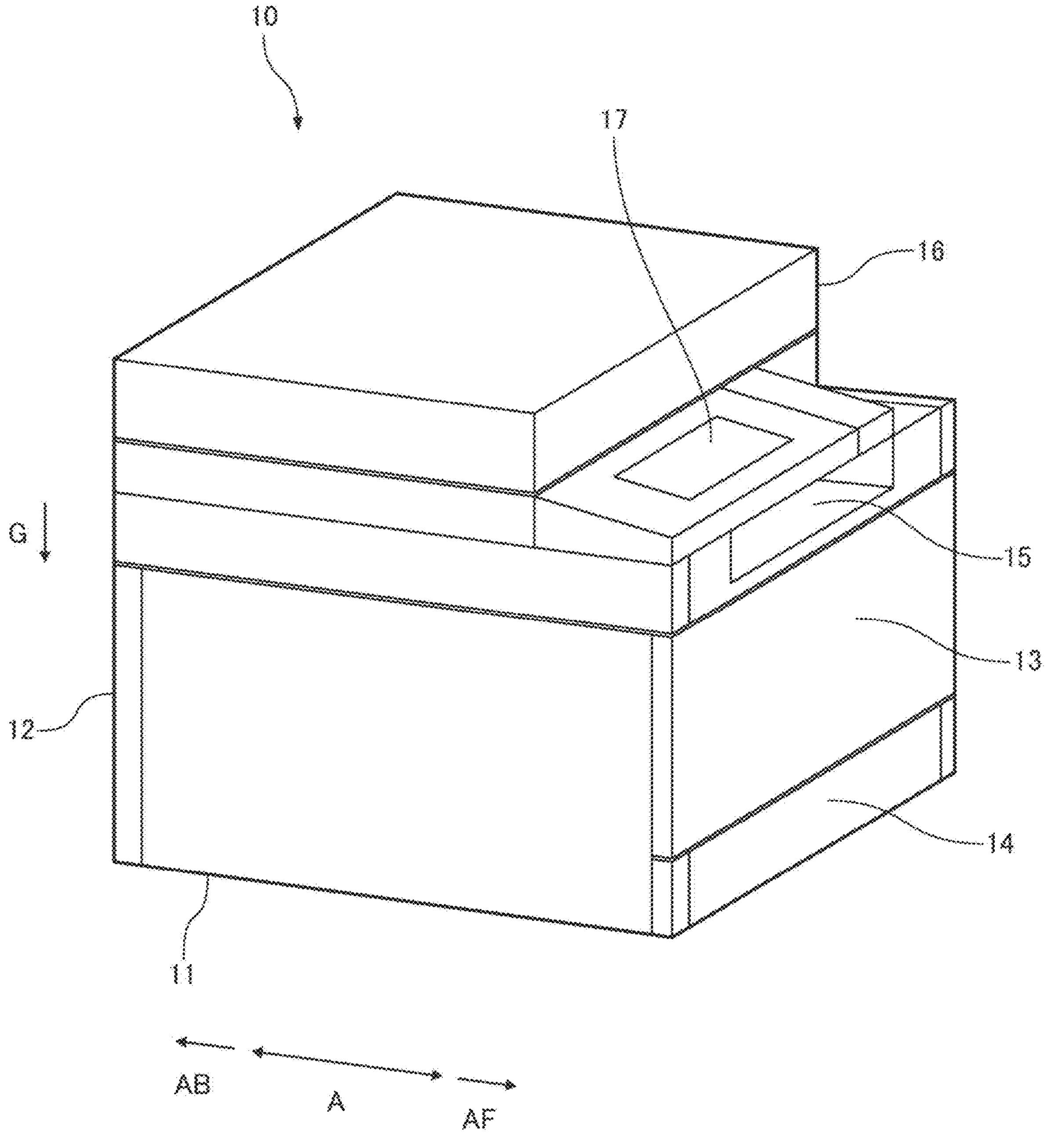
FIG. 1 is a schematic perspective view of an image forming apparatus according to an embodiment of the present disclosure.

First of all, the entire configuration of the image forming apparatus 10 according to the embodiment of the present disclosure will be described with reference to FIG. 1. FIG. 1 is a schematic perspective view of the image forming apparatus 10. The image forming apparatus 10 is, for example, a multifunction peripheral with printer, scanner, and copier functions. The image forming apparatus 10 may have a facsimile function. The image forming apparatus 10 forms an image on a paper sheet. In this embodiment, the image forming apparatus 10 forms an image on a paper sheet by an electrophotographic method.

As shown in FIG. 1, in this embodiment, the image forming apparatus 10 includes a casing 11, a paper delivery tray 15, an image scanning part 16, and an operation part 17. An image is formed on a paper sheet inside the casing 11. Then, the paper sheet with the image formed thereon is delivered to the paper delivery tray 15.

The image scanning part 16 scans a document not shown in FIG. 1 and generates image data. The image forming apparatus 10 advantageously forms an image on a paper sheet on the basis of the image data generated by the image scanning part 16, for example. Alternatively, the image forming apparatus 10 may form an image on a paper sheet on the basis of image data sent to the image forming apparatus 10 from an external apparatus (e.g., a computer).

The operation part 17 includes a display part and an input part. The display part is, for example, a liquid-crystal display and notifies a user of necessary information. The input part is, for example, a keypad and receives an instruction from the user. The operation part 17 may be a touch panel display where the display part and the input part are integrated.

The casing 11 houses mechanical components and the like for forming an image on a paper sheet. A rear cover 12 is provided on a surface at one side AB of a first direction A in the casing 11. Moreover, a front cover 13 is provided on a surface at another side AF of the first direction A in the casing 11. The first direction A is a direction that intersects with a gravity direction G (vertical direction) in the casing 11.

Hereinafter, in this specification, the first direction A will be sometimes referred to as a front-back direction A, the one side AB of the first direction A (front-back direction A) will be sometimes referred to as back AB, and the other side AF of the first direction A will be sometimes referred to as front AF. The rear cover 12 opens and closes the surface in the back AB of the casing 11. The front cover 13 opens and closes a surface of the casing 11 in the front AF. Moreover, a paper feeding cassette 14 that stores paper sheets is provided below the front cover 13 at the front AF of the casing 11.

Figure 2:
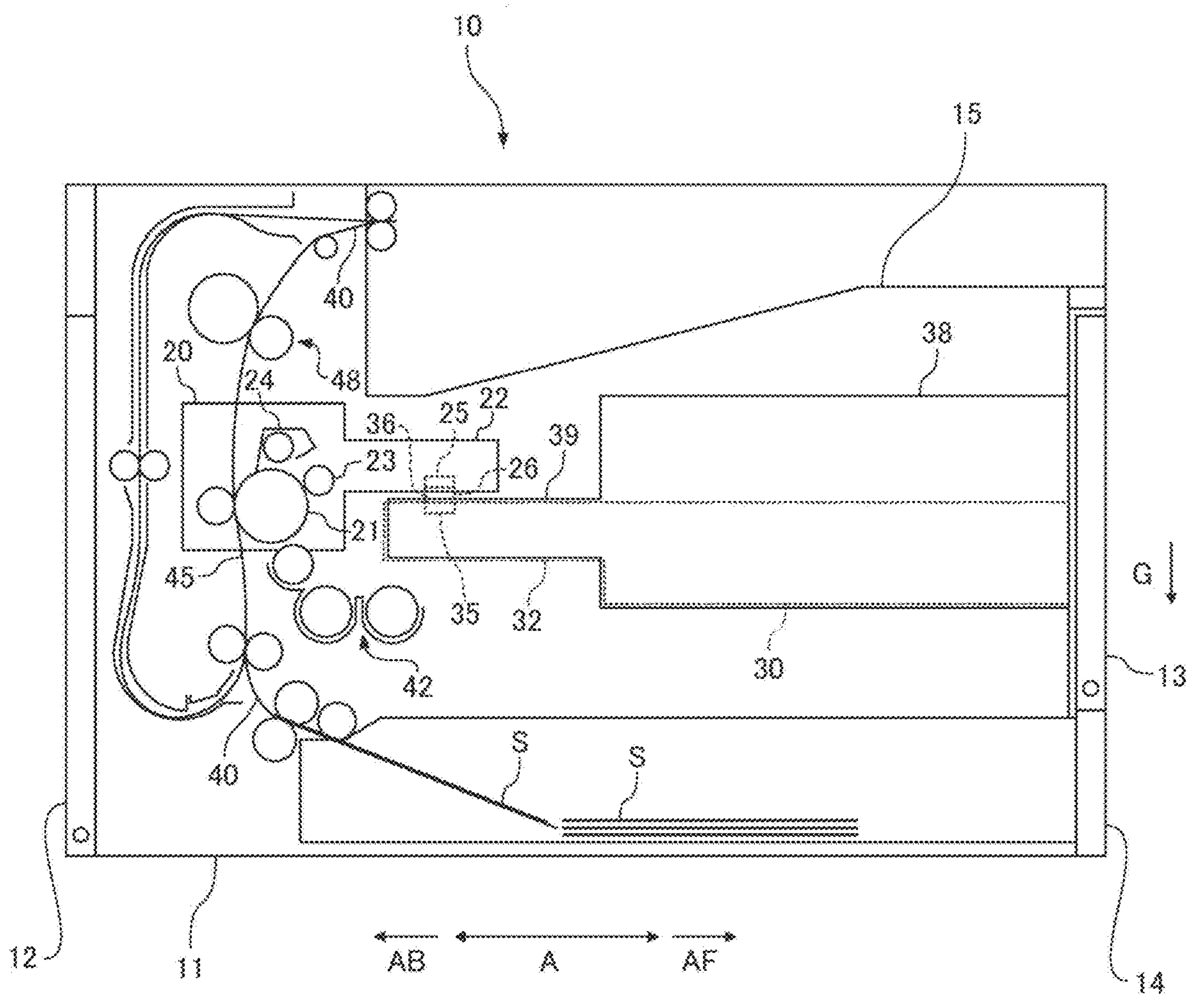
FIG. 2 is a schematic cross-sectional view of the image forming apparatus.

Next, an image forming operation of the image forming apparatus 10 will be described with reference to FIG. 2. FIG. 2 is a schematic cross-sectional view of the image forming apparatus 10. FIG. 2 shows a cross-sectional view as the casing 11 is taken along a vertical surface in an orientation parallel to the first direction A. In FIG. 2, a left-right direction is the first direction A and an up-down direction is the gravity direction G.

The casing 11 houses the image carrier unit 20 and the waste toner container 30. Moreover, a toner feeding container 38, a developing unit 42, a transferring belt 45, and a fixation apparatus 48 are further arranged in the casing 11. Although not shown in FIG. 2, an exposure device including a laser light emitter is arranged in the casing 11. The transferring belt 45 is arranged along a circulation path extending in the gravity direction G inside the casing 11. The transferring belt 45 is suspended over a plurality of rollers. By rotating the plurality of rollers, the transferring belt 45 is driven to circulate on the circulation path. Moreover, a conveyance path 40 of paper sheets S, which are conveyed from the paper feeding cassette 14 to the paper delivery tray 15 through a part of the circulation path of the transferring belt 45, is provided inside the casing 11.

The image carrier unit 20 includes an image carrier 21, a discharge passageway 22, a charging device 23, and a cleaner 24. An electrostatic latent image is formed on the image carrier 21. The discharge passageway 22 guides waste toner. The charging device 23 charges the surface of the image carrier 21. The cleaner 24 removes toner remaining on the image carrier 21 as waste toner. The image carrier unit 20 further includes an exit port 25 and an exit port shutter 26. The exit port 25 is used for discharging the waste toner. The exit port shutter 26 opens and closes the exit port 25. In FIG. 2, the discharge passageway 22 extends in the first direction A and guides the waste toner to the exit port 25 to the other side AF (front AF) of the first direction A. Moreover, the exit port 25 is formed on the discharge passageway 22.

The waste toner container 30 is a container that collects the waste toner discharged from the image carrier unit 20. The waste toner container 30 includes a reception passageway 32, a reception inlet 35, and a reception inlet shutter 36. The reception passageway 32 guides the waste toner. The reception inlet 35 receives the waste toner discharged from the exit port 25. The reception inlet shutter 36 opens and closes the reception inlet 35. In FIG. 2, the reception passageway 32 extends in the first direction A and guides the waste toner received from the reception inlet 35 to the other side AF (front AF) of the first direction A. Moreover, the reception inlet 35 is formed on the reception passageway 32.

The toner feeding container 38 is a container that supplies toner to be used in the image carrier unit 20. The toner feeding container 38 includes a supply passageway 39 that extends in the first direction A. The toner feeding container 38 guides toner to the one side AB (back AB) of the first direction A through the supply passageway 39 and supplies the toner to the developing unit 42. The toner supplied to the developing unit 42 is used in the image carrier unit 20.

In FIG. 2, the toner feeding container 38 is a container that is integrated with the waste toner container 30. Since the toner feeding container 38 and the waste toner container 30 are integrated, only a small space in the casing 11 is required for supplying toner and collecting waste toner. Therefore, the image forming apparatus 10 can be downsized. Moreover, the toner feeding container 38 and the waste toner container 30 can be replaced at a time. It improves the operability of the image forming apparatus 10. Note that the toner feeding container 38 is not limited to the one integrated with the waste toner container 30, and the toner feeding container 38 may be a container separated from the waste toner container 30. In a case where the toner feeding container 38 is a container separated from the waste toner container 30, the user can replace only one of the toner feeding container 38 and the waste toner container 30 that the user should replace.

The image carrier 21 of the image carrier unit 20 is a member on which an electrostatic latent image is formed. The image carrier 21 of the image carrier unit 20 is, for example, a photosensitive drum. The image carrier 21 is arranged to rotate at a position close to the transferring belt 45.

The charging device 23 charges the surface of the image carrier 21. The exposure device not shown in FIG. 2 emits laser light to the image carrier 21 and forms an electrostatic latent image based on the image data on the surface of the image carrier 21. The developing unit 42 develops the electrostatic latent image of the image carrier 21 with toner. A toner image is thus formed on the surface of the image carrier 21. The toner image on the image carrier 21 is transferred to the transferring belt 45. Note that the cleaner 24 removes toner remaining on the image carrier 21 as waste toner.

The paper feeding cassette 14 stores the plurality of paper sheets S. The paper sheets S in the paper feeding cassette 14 are fed to the conveyance path 40 one by one. The transferring belt 45 transfers a toner image to the paper sheet S transported to the conveyance path 40. The toner image transferred to the paper sheet S is fixed to the paper sheet S by the fixation apparatus 48. Then, the paper sheet S with the toner image fixed thereto is delivered to the paper delivery tray 15. The image forming operation of the image forming apparatus 10 is performed in the above-mentioned manner. Note that the paper sheet S may be transported to the conveyance path 40 from the back AB of the casing 11 with the rear cover 12 of the casing 11 opened.

Figure 3:
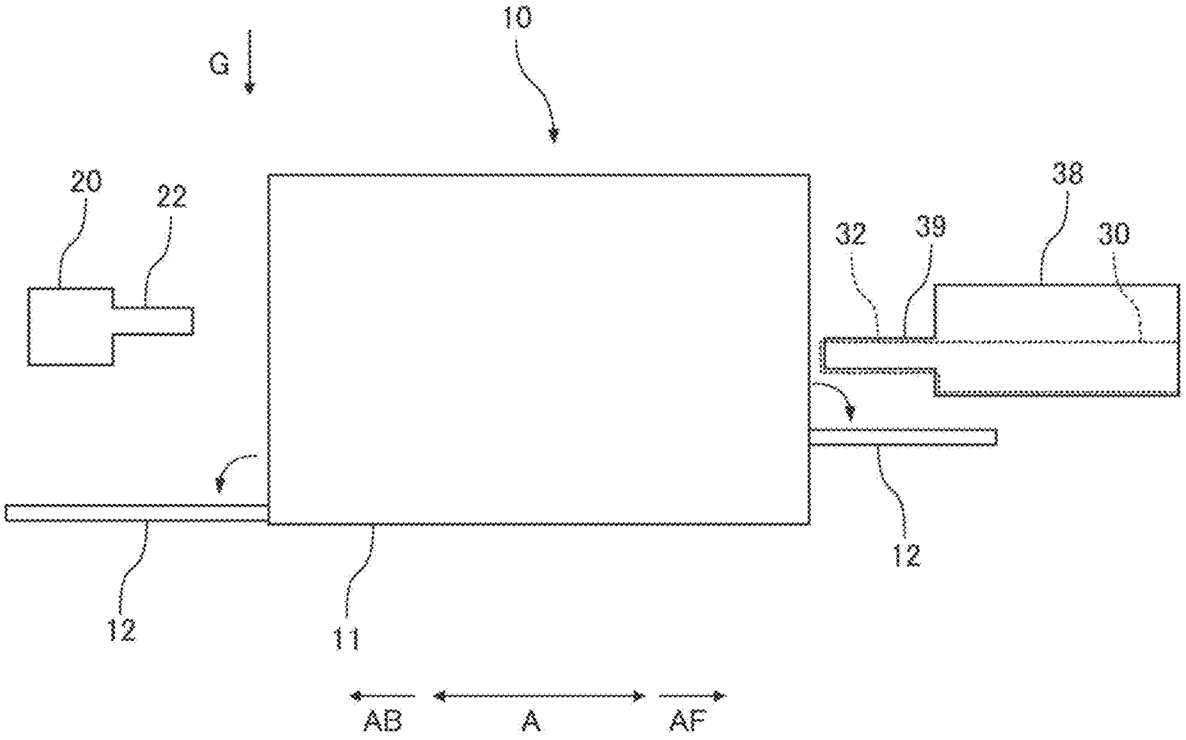
FIG. 3 is a schematic side view showing a state in which an image carrier unit and a waste toner container are inserted and removed with respect to a casing of the image forming apparatus.

Next, insertion and removal of the image carrier unit 20 and the waste toner container 30 with respect to the casing 11 will be described with reference to FIGS. 2 and 3. FIG. 3 is a schematic side view showing a state in which the image carrier unit 20 and the waste toner container 30 are inserted and removed with respect to the casing 11 of the image forming apparatus 10.

As shown in FIG. 3, the image carrier unit 20 is insertable or removable from the one side AB (back AB) of the first direction A in the casing 11. The waste toner container 30 is insertable or removable from the other side AF (front AF) of the first direction A in the casing 11. Specifically, in a case where the rear cover 12 provided on the surface at the one side AB of the first direction A in the casing 11 is opened, the image carrier unit 20 is insertable or removable with respect to the casing 11 from the one side AB of the first direction A. Moreover, in a case where the front cover 13 provided on the surface at the other side AF of the first direction A in the casing 11 is opened, the waste toner container 30 is insertable or removable with respect to the casing 11 from the other side AF of the first direction A. Note that since the waste toner container 30 is a container integrated with the toner feeding container 38 in this embodiment, the waste toner container 30 and the toner feeding container 38 are insertable or removable with respect to the casing 11 together from the other side AF of the first direction A.

In the image forming apparatus 10 according to this embodiment, the insertion and removal of the image carrier unit 20 with respect to the casing 11 from the one side AB of the first direction A and the insertion and removal of the waste toner container 30 with respect to the casing 11 from the other side AF of the first direction A can be independently performed. Therefore, in accordance with the image forming apparatus 10 according to this embodiment, the image carrier unit 20 and the waste toner container 30 are independently replaceable. That is, the user can perform the replacement of the image carrier unit 20 and the replacement of the waste toner container 30 at the same time. It improves the operability of the image forming apparatus 10.

By the way, regarding the image forming apparatus according to Japanese Patent Application Laid-open No. 2017-68211, a drum unit including an image carrier is arranged more inside than a toner cartridge including a waste toner collection part inside the image forming apparatus. In the image forming apparatus according to Japanese Patent Application Laid-open No. 2017-68211, it is necessary to first remove the outside toner cartridge from the image forming apparatus for removing the inside drum unit from the image forming apparatus. Therefore, even in a case where only the drum unit should be replaced, it is necessary to first remove the toner cartridge from the image forming apparatus. In a case where both the drum unit and the toner cartridge should be replaced, the toner cartridge is replaced after the drum unit is replaced. Therefore, in the image forming apparatus according to Japanese Patent Application Laid-open No. 2017-68211, the user cannot perform the drum unit replacement and the toner cartridge replacement at the same time. In contrast, in accordance with the image forming apparatus 10 according to this embodiment, the unit including the image carrier and the waste toner container are independently replaceable.

The image carrier unit 20 and the waste toner container 30 are inserted into the casing 11 from the back AB and the front AF of the casing 11, respectively, and are housed in the casing 11. In a state in which the image carrier unit 20 and the waste toner container 30 are housed in the casing 11, as shown in FIG. 2, the image carrier unit 20 is disposed at a position closer to the one side AB of the first direction A than the waste toner container 30 inside the casing 11. That is, the image carrier unit 20, which is inserted and removed with respect to the casing 11 from the back AB, is disposed at a position closer to the back AB inside the casing 11. The waste toner container 30, which is inserted and removed with respect to the casing 11 from the front AF, is disposed at a position closer to the front AF inside the casing 11.

Therefore, in the image forming apparatus 10 according to this embodiment, the user can remove only a part to be replaced from the casing 11 when only one of the image carrier unit 20 and the waste toner container 30 should be replaced.

Note that a mechanism that guides the insertion and removal of the image carrier unit 20 and the waste toner container 30 is favorably provided so that the image carrier unit 20 and the waste toner container 30 can be disposed at appropriate positions inside the casing 11. For example, a rail that guides the image carrier unit 20 and a rail that guides the waste toner container 30 are advantageously provided on the inner surface of the casing 11.

Figure 4:
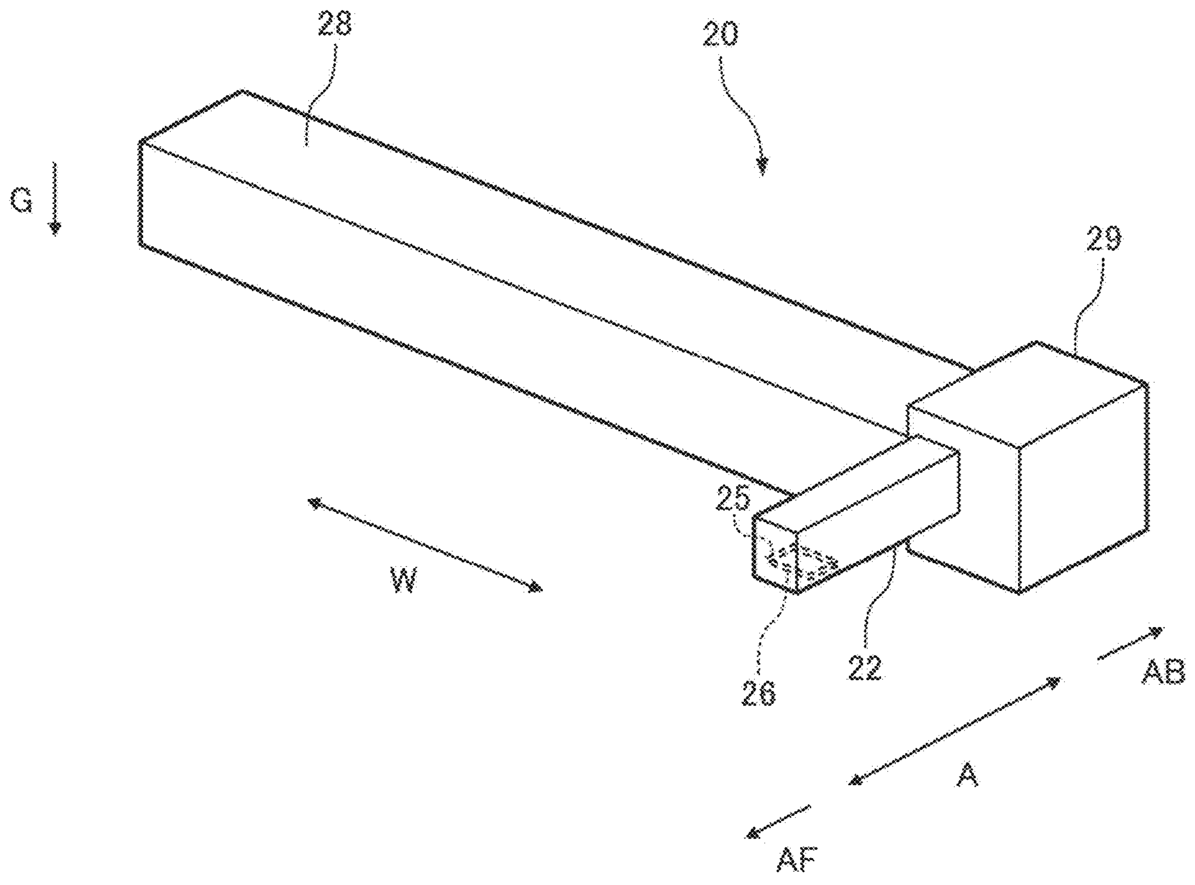
FIG. 4 is a schematic perspective view of the image carrier unit.
Figure 5:
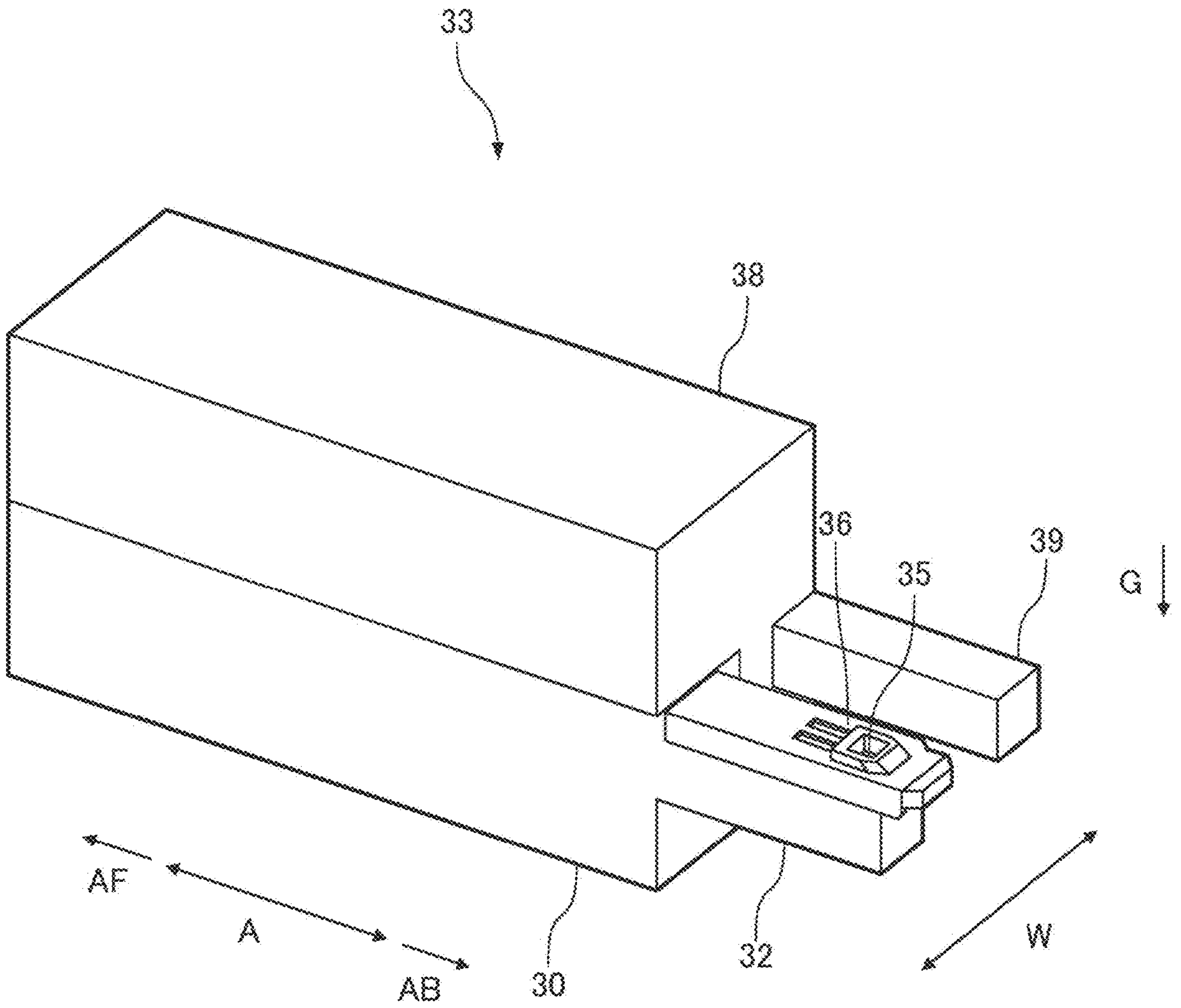
FIG. 5 is a schematic perspective view of the waste toner container.
Figure 6:
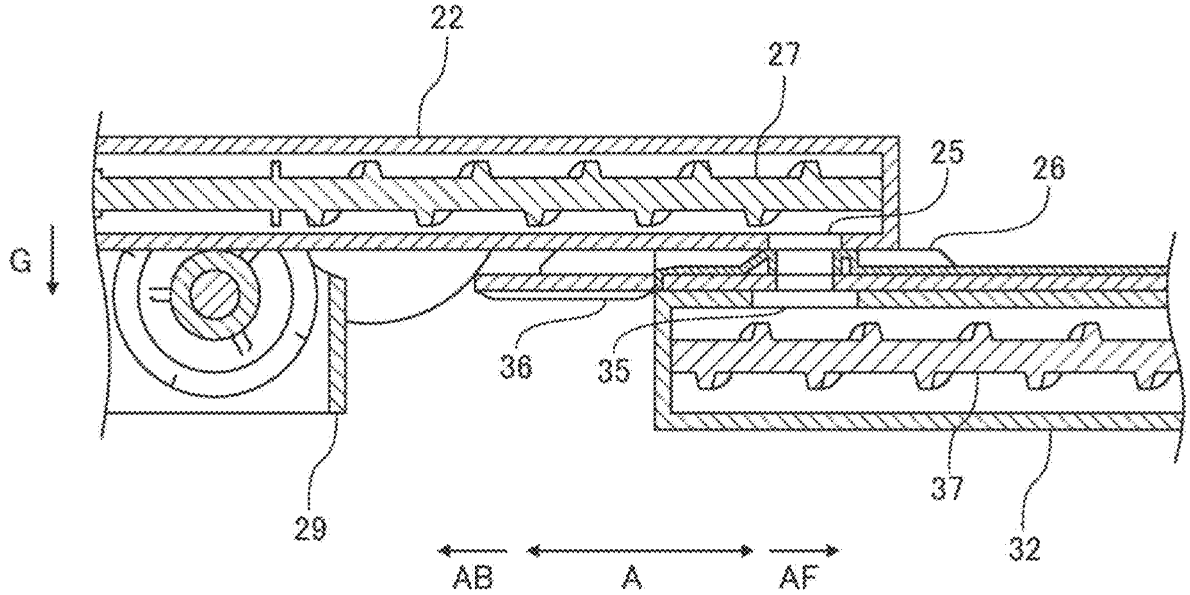
FIG. 6 is a schematic cross-sectional view of a discharge passageway and a reception passageway.

Next, the discharge passageway 22 and the exit port 25 of the image carrier unit 20 and the reception passageway 32 and the reception inlet 35 of the waste toner container 30 will be described with reference to FIGS. 2, 4, 5, and 6. FIG. 4 is a schematic perspective view of the image carrier unit 20. FIG. 5 is a schematic perspective view of the waste toner container 30. FIG. 6 is a schematic cross-sectional view of the discharge passageway 22 and the reception passageway 32.

The image carrier unit 20 in FIG. 4 includes a thin and long image carrier accommodation unit 28 and an image carrier drive unit 29. The image carrier accommodation unit 28 extends in a second direction W. The image carrier drive unit 29 is provided at an end portion of the image carrier accommodation unit 28. Note that the second direction W is a direction that intersects with both the gravity direction G and the first direction A and corresponds to a width direction of the paper sheet S.

The image carrier accommodation unit 28 houses image carrier 21 (FIG. 2). Since the toner image transferred to the entire paper sheet S in the width direction is formed on the surface of the image carrier 21, the image carrier 21 has a width dimension (dimension in the second direction W) larger than the width dimension of the paper sheet S. Therefore, as shown in FIG. 4, the image carrier accommodation unit 28 has a thin and long shape extending in the second direction W. The image carrier drive unit 29 rotates the image carrier 21 in the image forming operation of the image forming apparatus 10.

The discharge passageway 22 extends to the other side AF (front AF) of the first direction A from the image carrier drive unit 29. The waste toner removed from the surface of the image carrier 21 is collected to the image carrier drive unit 29 from the image carrier accommodation unit 28. Then, the waste toner is guided to the exit port 25 through the discharge passageway 22.

The exit port 25 is provided on a lower surface of the discharge passageway 22 in the gravity direction G, in vicinity of an end portion of the discharge passageway 22, which is located at the front AF. The exit port shutter 26 is provided in a lower position than the exit port 25. The exit port shutter 26 opens and closes the exit port 25. Specifically, for example, the exit port shutter 26 advantageously opens and closes the exit port 25 by sliding in the first direction A along the lower surface of the discharge passageway 22. Moreover, the exit port shutter 26 is advantageously biased in a direction to close the exit port 25 through an elastic member (e.g., spring) (not shown).

Next, the waste toner container 30 in FIG. 5 has an elongated shape extending in the first direction A. Note that the waste toner container 30 in FIG. 5 is an integrated-type cartridge 33 that is integrated with the toner feeding container 38. In the integrated-type cartridge 33 in FIG. 5, the toner feeding container 38 has a shape to cover an upper surface and a side surface of the waste toner container 30. Specifically, the toner feeding container 38 has a shape to cover an upper surface of the waste toner container 30 in the gravity direction G and extend downwards in the gravity direction G from an end portion in the second direction W. In FIG. 5, the toner feeding container 38 has an inverted L-shape as viewed in the first direction A.

The reception passageway 32 of the waste toner container 30 extends to the back AB from an end surface of the waste toner container 30, which is located at the one side AB (back AB) of the first direction A. Moreover, the supply passageway 39 of the toner feeding container 38 extends to the back AB from the end surface of the toner feeding container 38 in the back AB.

The reception inlet 35 of the waste toner container 30 is provided on an upper surface of the reception passageway 32 in the gravity direction G, in vicinity of an end portion of the reception passageway 32, which is located at the back AB. The reception inlet shutter 36 is provided in an upper position than the reception inlet 35. The reception inlet shutter 36 opens and closes the reception inlet 35. Specifically, for example, the reception inlet shutter 36 advantageously opens and closes the reception inlet 35 by sliding in the first direction A along the upper surface of the reception passageway 32. Moreover, the reception inlet shutter 36 is advantageously biased in a direction to close the reception inlet 35 through an elastic member (e.g., spring) (not shown).

As shown in FIG. 2, when the image carrier unit 20 and the waste toner container 30 are arranged inside the casing 11, the discharge passageway 22 of the image carrier unit 20 is arranged in an upper position in the gravity direction G than the reception passageway 32 of the waste toner container 30.

Portions of the image carrier unit 20 and the waste toner container 30, excluding the discharge passageway 22 and the reception passageway 32, can be disposed at positions that are distant from each other in the first direction A in the casing 11 because of the discharge passageway 22 and the reception passageway 32 that guide the waste toner in the first direction A.

For example, the image carrier accommodation unit 28 and the image carrier drive unit 29, and portions occupying a large space, such as a waste toner storage portion of the waste toner container 30, can be arranged in regions distant from each other. The waste toner is guided to the waste toner container 30 from the image carrier unit 20 even when the image carrier unit 20 and the waste toner container 30 are distant from each other because of the discharge passageway 22 and the reception passageway 32. Therefore, the degree of freedom in the lay-out of components of the image forming apparatus 10 increases. Moreover, arranging the discharge passageway 22 in an upper position than the reception passageway 32 enables the discharge passageway 22 and the reception passageway 32 to be arranged in partially overlapping regions in a planar view. Downsizing of the image forming apparatus 10 can be thus achieved.

When the image carrier unit 20 and the waste toner container 30 are arranged inside the casing 11, as shown in FIG. 6, the exit port 25 and the reception inlet 35 are disposed at positions to face each other (in FIG. 6, positions to face each other in up and down directions in the gravity direction G).

The exit port shutter 26 and the reception inlet shutter 36 favorably close the exit port 25 and the reception inlet 35, respectively, through the elastic members or the like when the exit port 25 and the reception inlet 35 do not face each other. The exit port shutter 26 opens the exit port 25 when the exit port 25 and the reception inlet 35 are disposed at positions to face each other. The reception inlet shutter 36 opens the reception inlet 35. Therefore, in accordance with the image forming apparatus 10 according to this embodiment, the exit port 25 and the reception inlet 35 are opened when the waste toner is reliably transported from the image carrier unit 20 to the waste toner container 30. Therefore, the waste toner is prevented from being scattered from the exit port 25 or the reception inlet 35.

Specifically, the exit port 25 and the reception inlet 35 are opened by the exit port shutter 26 and the reception inlet shutter 36 sliding each other. When the image carrier unit 20 is inserted into the casing 11 from the one side AB of the first direction A and the waste toner container 30 is inserted into the casing 11 from the other side AF of the first direction A, the discharge passageway 22 and the reception passageway 32 approach each other in the first direction A.

The discharge passageway 22 is arranged in an upper position in the gravity direction G than the reception passageway 32. The discharge passageway 22 is disposed at a position where the exit port shutter 26 sliding along the lower surface of the discharge passageway 22 is brought into contact with the reception inlet shutter 36 sliding along the upper surface of the reception passageway 32 specifically when the discharge passageway 22 and the reception passageway 32 approach each other. Therefore, when the image carrier unit 20 and the waste toner container 30 are inserted into the casing 11, the exit port shutter 26 and the reception inlet shutter 36 are brought into contact with each other to slide each other in the first direction A, and the exit port 25 and the reception inlet 35 are opened as shown in FIG. 6. The exit port shutter 26 and the reception inlet shutter 36 favorably have a shape with which they hook each other when they are brought into contact with each other in the first direction A to slide each other.

Note that a mechanism that positions the image carrier unit 20 and the waste toner container 30 is favorably provided so that the exit port 25 and the reception inlet 35 can be reliably opened when the image carrier unit 20 and the waste toner container 30 are arranged inside the casing 11. For example, a rail that guides the image carrier unit 20 and the waste toner container 30 and a stopper that positions the image carrier unit 20 and the waste toner container 30 are advantageously provided on the inner surface of the casing 11.

As shown in FIG. 6, a waste toner discharge screw 27 that extends in the first direction A is provided inside the discharge passageway 22. Moreover, a waste toner reception screw 37 that extends in the first direction A is provided inside the reception passageway 32. The waste toner discharge screw 27 rotates about the first direction A by receiving driving force from the image carrier drive unit 29 and the like and conveys the waste toner in the image carrier unit 20 to the exit port 25 to the other side AF of the first direction A.

The waste toner conveyed to the exit port 25 falls from the exit port 25 due to the gravity, passes through the reception inlet 35 facing the exit port 25, and is received in the reception passageway 32. The waste toner reception screw 37 in the reception passageway 32 rotates about the first direction A and conveys the waste toner received from the reception inlet 35 to the waste toner container 30 to the other side AF of the first direction A. In the above-mentioned manner, the waste toner discharged from the image carrier unit 20 is collected to the waste toner container 30.

Although the single image carrier unit 20 and the single waste toner container 30 are described above for the description, a plurality of image carrier units 20 and a plurality of waste toner containers 30 may be provided. For example, in a case where the image forming apparatus 10 is a color printer using toners in four colors, four image carrier units 20 and four waste toner containers 30 are advantageously provided, corresponding to the toners in four colors, respectively. Note that the toners in four colors are advantageously, for example, four colors of YMCK (Y: yellow, M: magenta, C: cyan, K: black). Moreover, a plurality of developing units 42 is advantageously also provided, corresponding to the respective colors for the image carrier units 20 and the waste toner containers 30.

The plurality of image carrier units 20 is advantageously insertable or removable from the one side AB of the first direction A at different heights with respect to the casing 11. The plurality of image carrier units 20 is arranged in a height direction (gravity direction G) with respect to the transferring belt 45 inside the casing 11.

The plurality of image carrier units 20 advantageously transfers toner images in the corresponding colors to the transferring belt 45. The plurality of image carrier units 20 transfers the toner images in the corresponding colors to the transferring belt 45. In this manner, a multiple-color (e.g., full-color) toner image are formed on the transferring belt

45. Then, multiple-color image formation on the paper sheet S is performed by transferring the multiple-color toner image to the paper sheet S.

The plurality of waste toner containers 30 is advantageously insertable or removable from the other side AF of the first direction A at different heights with respect to the casing 11. The plurality of waste toner containers 30 collects the waste toners discharged from the corresponding image carrier units 20 inside the casing 11.

Hereinabove, the embodiment of the present disclosure has been described with reference to the drawings. Note that the present disclosure is not limited to the above-mentioned embodiment, and may be carried out in various aspects without departing from the gist of the present disclosure. For easy understanding, the drawings each schematically show configurations of elements mainly, and the thickness, the length, the number of items, the intervals, and the like of each component shown in the figure are different from the actual ones for the sake of convenience for creating the drawings. Moreover, the material, the shape, the dimensions, and the like of each component shown in the above-mentioned embodiment, and there are no particular limitations and various modifications can be made without substantially departing from the configurations of the present disclosure.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus, comprising:

a casing;

an image carrier unit that is housed in the casing and includes an image carrier on which an electrostatic latent image is formed;

a waste toner container that is housed in the casing and collects waste toner discharged from the image carrier unit; and a toner feeding container that supplies toner to be used in the image carrier unit, wherein the image carrier unit is insertable or removable from one side of a first direction in the casing, the waste toner container is insertable or removable from another side of the first direction in the casing, the toner feeding container is a container integrated with the waste toner container, the toner feeding container has a shape to cover an upper surface of the waste toner container in a gravity direction and extends downwards in the gravity direction from an end portion in a second direction that intersects with both the gravity direction and the first direction, and the shape is an inverted L-shape as viewed in the first direction, the image carrier unit includes an exit port for discharging the waste toner and an exit port shutter that opens and closes the exit port, the waste toner container includes a reception inlet for receiving the waste toner discharged from the exit port and a reception inlet shutter that opens and closes the reception inlet, when the image carrier unit is inserted into the casing from the one side of the first direction and the waste toner container is inserted into the casing from the other side of the first direction, the exit port and the reception inlet are disposed at positions where the exit port and the reception inlet face each other vertically in the gravity direction and the exit port shutter and the reception inlet shutter are brought into contact with each other to slide each other in the first direction and thereby open the exit port and the reception inlet, the image carrier unit further includes a discharge passageway that guides the waste toner to the exit port to the other side of the first direction, the waste toner container further includes a reception passageway that guides the waste toner received from the reception inlet to the other side of the first direction, and the discharge passageway is arranged in an upper position than the reception passageway in the gravity direction.

2. The image forming apparatus according to claim 1, wherein the image carrier unit is, inside the casing, disposed at a position closer to the one side of the first direction than the waste toner container.

* * * * *